United States Patent [19]

Hellemons

[11] Patent Number: 5,204,136
[45] Date of Patent: Apr. 20, 1993

[54] PROCESS FOR EXTRACTING COFFEE

[75] Inventor: Adrianus C. M. Hellemons, Montfoort, Netherlands

[73] Assignee: Douwe Egbets Koninklijke Tabaksfa-Briek-Koffiebranderijen-Theehandel N.V., Urecht, Netherlands

[21] Appl. No.: 690,393

[22] Filed: Apr. 25, 1991

Related U.S. Application Data

[63] Continuation of Ser. No. 379,048, Jul. 13, 1989, abandoned.

[30] Foreign Application Priority Data

Jul. 13, 1988 [NL] Netherlands .......................... 8801775
Feb. 6, 1989 [NL] Netherlands .......................... 8900285

[51] Int. Cl.$^5$ ................................................ A23F 5/24
[52] U.S. Cl. ..................................... 426/594; 426/388; 426/431; 426/432
[58] Field of Search ................. 426/594, 388, 431, 433

[56] References Cited

U.S. PATENT DOCUMENTS 3,821,434 6/1974 Houghton-Larsen et al. ...... 426/594

FOREIGN PATENT DOCUMENTS 980165 12/1975 Canada .
0097466 1/1984 European Pat. Off. .
1162479 4/1958 France .
6803767 of 1968 Netherlands .

OTHER PUBLICATIONS

Sivetz et al. "Coffee Technology", 1979. AVI Publishing Co., Westport, CT. pp. 335-336.

*Primary Examiner*—Steven Weinstein
*Assistant Examiner*—Anthony Weier

[57] ABSTRACT

A process for preparing an extract from ground, roasted coffee is described. A primary extract is prepared by exhaustive primary extraction with water or an aqueous solution in one or more extraction cells including one cell to which extraction liquid is supplied. A secondary extract is prepared by secondary extraction with water or an aqueous solution in one or more extraction cells including one cell from which secondary extract is drawn off. The process is conducted so that when the primary extraction cell to which the water or the aqueous solution is supplied has been exhaustively extracted, this cell is connected through to the secondary extraction as an extraction cell from which secondary extract is withdrawn, and the first quantity of extract from the cell connected through, which quantity corresponds approximately to the liquid contents of said cell, is supplied to the primary extraction as an extraction liquid.

17 Claims, 1 Drawing Sheet

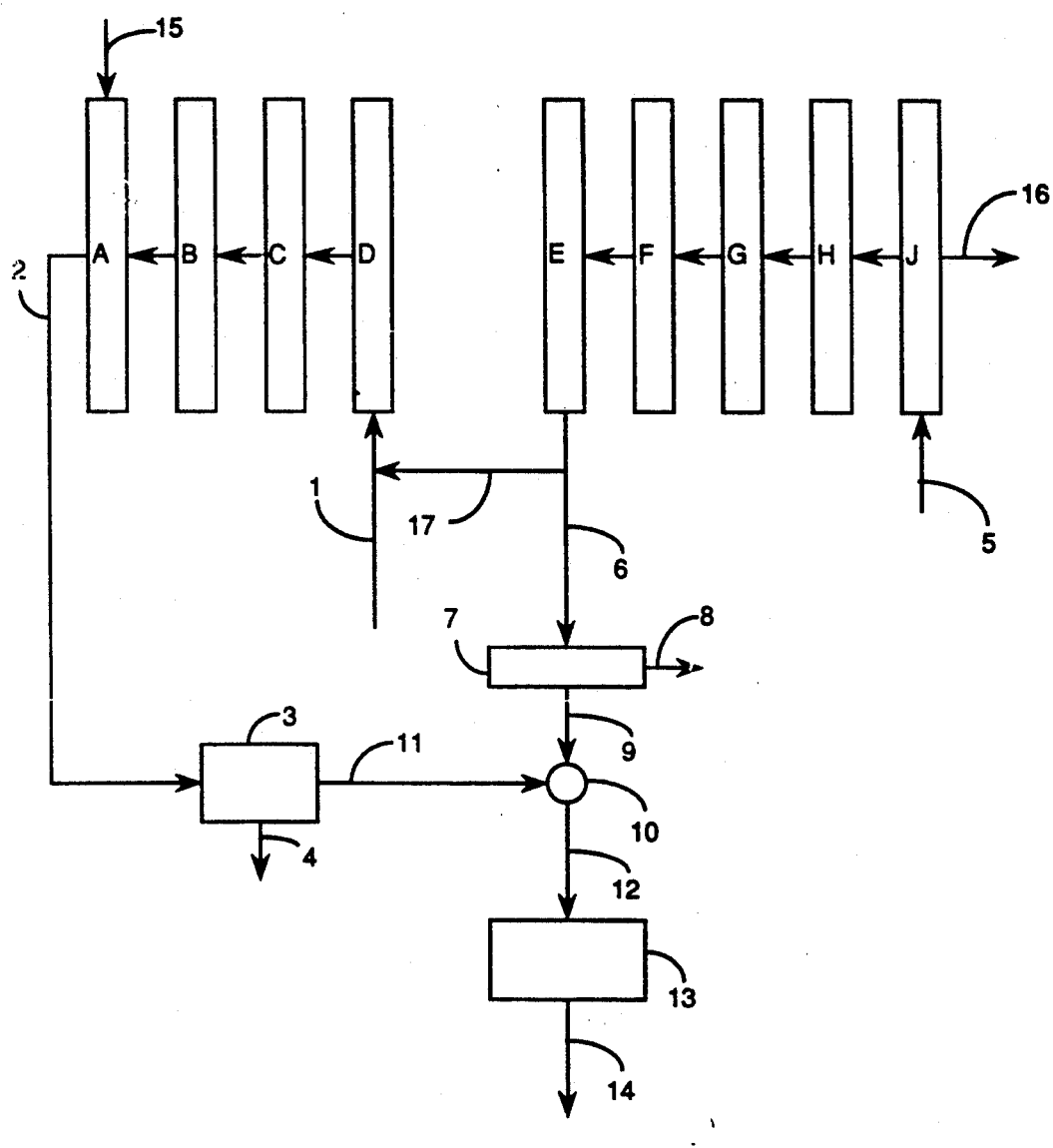

PROCESS FOR EXTRACTING COFFEE

This is a continuation of application No. 07/379,048, filed on Jul. 13, 1989, which was abandoned upon the filing hereof.

BACKGROUND OF THE INVENTION

This invention relates to a process for preparing an extract from ground, roasted coffee, which comprises preparing a primary extract by exhaustive primary extraction with water or an aqueous solution in one or more extraction cells including one cell to which extraction liquid is supplied; and subsequently preparing a secondary extract by secondary extraction with water or an aqueous solution in one or more extraction cells including one cell from which secondary extract is withdrawn; the process being conducted so that when the primary extraction cell to which the water or the aqueous solution is supplied has been exhaustively extracted, this cell is connected to the secondary extraction as the extraction cell from which secondary extract is withdrawn.

In the extraction of coffee for the preparation of instant coffee or coffee concentrate, two separate extraction stages are distinguished, namely, the primary extraction and the secondary extraction.

Primary extraction is generally carried out at a temperature maximally equal to the boiling point of water at atmospheric pressure. Under these conditions, only those components which are directly soluble in water are extracted from the coffee. Such an extraction corresponds approximately to the method used in making coffee at home. In such a method, using a very finely-ground coffee, a high water/coffee ratio (>15) and an extraction time of about 10 minutes, a coffee extract is obtained which is very good in quality. From the point of view of quality, this is the optimum manner of preparing coffee extract. However, on an industrial scale, this manner of preparation is not economically justified owing to the low efficiency (<30%).

In order to obtain a sufficiently high extraction efficiency in the extract, in industrial coffee extraction for the preparation of instant coffee or coffee concentrate, a secondary extraction is used as well. The coffee exhaustively extracted in the primary extraction is subjected to such conditions that a portion of the originally insoluble solid in the coffee is hydrolyzed to form soluble components which are then extracted in the secondary extraction. Conventional temperatures for this secondary extraction range between 120° and 190° C. Such extractions are generally carried out in a battery consisting of a plurality of series-connected extraction cells.

When such a coffee extract preparation is compared with the domestic way of making coffee, the following differences are noted:

1. The efficiency of the primary extraction is considerably lower. The reasons for this are:

aa. The use of large particles to minimize pressure drop in the cells.

bb. The use of a low draw-off factor, as a result of which a relatively low amount of hydrophobic aroma compounds are extracted. The presence of sufficient hydrophobic aroma compounds in an extract is of great importance to produce a flavor that is comparable to coffee made in the domestic way.

cc. The primary section is fed with an extraction liquid which already contains extracted material from the secondary section. As a consequence, the extraction in the primary section is much less efficient.

2. In the secondary extraction, an amount of secondary material (extracted solids) is extracted in a proportion approximately equal to the proportion of primary material. This secondary material adversely affects the quality of the extract owing to the presence of off-flavors. However, from the point of view of economy, it is necessary to use the secondary solids.

3. The residence time of the coffee and the extract in the extraction battery is extremely long. In combination with the conditions used, this leads to a deterioration in quality, which is manifested in the taste of the coffee made from the extract.

Part of these drawbacks can be overcome by using so-called split extraction In the split-extraction technique, the primary and the secondary extractions are fed with an extraction liquid independently of each other, so that a primary and a secondary extract are obtained separately from each other. An example of such a process is described in German Offenlegungschrift 27 41 524. In accordance with that process, the coffee is first exhaustively extracted in a primary extraction, subsequently heated in the absence of extraction liquid, and finally extracted further in a secondary extraction. The extracts thus obtained are then concentrated and mixed with each other. In this way, a clearly improved extract quality was obtained relative to split extraction without intermediate heating.

Methods for the split extraction of coffee have also been described in a number of other patent publications. In this connection reference can be made, by way of example, to U.S. Pat. Nos. 3,790,689, 3,810,766, EP-A-90 562, EP-A 97 466 and EP-A-159 754. The processes described in these publications, however, all have the disadvantage that rather a low draw-off factor is used, so that a relatively small amount of hydrophobic aroma components is extracted, with all adverse results of that. An additional consequence is that no exhaustive extraction is obtained in the primary section, so that a part of the primary components is exposed to the adverse effect of high temperature in the secondary section.

Canadian patent 980 165 discloses a process for the extraction of coffee in which the secondary extract is split into a product stream and a feed stream, which feed stream is used as an extraction liquid for the primary extraction.

SUMMARY OF THE INVENTION

In accordance with the present invention there is provided a process for preparing an extract from ground, roasted coffee, which comprises preparing a primary extract by exhaustive primary extraction with water or an aqueous solution in one or more extraction cells including one cell to which extraction liquid is supplied; and subsequently preparing a secondary extract by secondary extraction with water or an aqueous solution in one or more extraction cells including one cell from which secondary extract is withdrawn;

the process being conducted so that when the primary extraction cell to which the water or the aqueous solution is supplied has been exhaustively extracted, this cell is connected through to the secondary extraction as an extraction cell from which secondary extract is withdrawn: which process is characterized in that the first quantity of extract from the cell connected through, which quantity corresponds approximately with the liquid contents of said cell, is supplied to the primary extraction as an extraction liquid.

It has surprisingly been found that this process is productive of a coffee extract, for example, in the form of a powder or concentrate, which produces a coffee quality that is fairly similar to the quality of coffee made domestically.

An essential feature in the process according to the present invention is that the first draw from the extraction cell, which contains coffee subjected to exhaustive primary extraction and has been connected through to the secondary extraction, is used not as a secondary extract, but as an extraction fluid for the primary extraction. In fact, it has been found that if the primary extraction has actually been really exhaustive, the first draw from this cell contains virtually no secondary extract, but is virtually unchanged primary extraction fluid which, at best, contains some primary extract. Accordingly, the use of this fluid in the primary extraction not only improves the economy of the process, but results in a better extract quality.

It is noted that the expression "quantity that corresponds approximately to the liquid contents of the cell" indicates an amount that does no differ more than 25 vol.% from the liquid contents of the cell.

In this connection it is noted that it is known per se to use the contents of the fresh secondary extraction cell as an extraction liquid for the primary extraction. This, however, is always a combination with an extraction method which does not involve exhaustive primary extraction, so that there is no split extraction.

For the primary extraction, the draw-off factors used according to the present invention preferably range between 3 and 20. These values result in a primary extract having an optimum taste, while the dry solids concentration in the primary extract is still sufficiently high for concentrating the extract in an economic manner.

The draw-off factor used in the secondary extraction preferably ranges between 1 and 5. This draw-off factor is determined mainly by the aim to produce as much secondary extract as possible with as high a dry-solids content as possible.

In this connection the term "draw-off factor" means the ratio by weight of the extract withdrawn from the system and the amount of coffee supplied to the sytem.

The extracts obtained in the manner described above are preferably concentrated further. Preferably, the concentration of the primary extract is carried out under conditions in which the aroma components are substantially maintained or are recovered. Most processes for concentrating coffee extract employ a form of evaporation for the removal of the large amounts of water from the extract. It is generally known, however, that evaporation is generally accompanied with the undesirable removal or loss of a number of aroma components. The result is an undesirable loss in quality. To overcome this problem, a number of processes have been developed, aiming at retaining the flavour components to a greater or lesser extent. Examples are stripping and collecting the aroma components prior to the evaporation of water, or the use of reverse osmosis. According to the present invention, however, freeze concentration is preferred. Such a process is described, for example, in GB-A-2 023 564 and GB-A- 2 082 081.

Reverse osmosis also gives a high aroma retention. A notorious problem was, however, that the membrane was greatly fouled. When composite membranes are used, however, as marketed for example by Stork-/Wafilin, this technique can also be used on an industrial scale. A description of the use of reverse osmosis is given in NL-A-6803767.

In accordance with a preferred embodiment of the present invention, the water obtained during freeze concentration or reverse osmosis is used as water of extraction.

In accordance with another embodiment of the invention, more conventional methods are used for the concentration of the extract. One such method is the stripping of the extract with steam, followed by the concentration of the extract by the evaporation of water. Steam stripping will remove a large part of the aroma components. These aroma components are subsequently condensed and can be re-added to the concentrated extract later. The aroma components remaining behind in the stripped extract are generally removed completely or substantially completely during evaporation. Accordingly, in the process described above, aroma retention is less than when freeze concentration or reverse osmosis is used, for example.

The secondary extract is preferably concentrated under such conditions that aroma components which may be present in the extract are removed. As the components in question are particularly aroma components which may have an adverse effect on the quality of the extract, such a method of concentration has the advantage that the quality of the total extract is improved.

Evaporation is a preferred method in this connection, as such a method is most attractive economically.

The extracts thus obtained are subsequently mixed and brought into a form suitable for use and sale. When it is the intention for the extract to be processed to form an instant powder, the extract can be spray dried or freeze dried. When used in the form of a concentrate, the extract is preferably frozen, in which form it can be stored for a long time and can be defrosted shortly before use.

The process according to the invention can in principle be carried out in known per se equipment. More specifically, a battery extractor is used for the extraction, which is based on the use of a plurality of extraction cells. The primary extraction is generally carried out in at least two extraction cells, more in particular in three or four cells. The extraction is generally effected in such a manner that the fresh coffee is introduced into the first primary extraction cell, that is to say, the extraction cell from which the extract is drawn. To the last extraction cell, fresh water or an aqueous solution is supplied as an extraction liquid. The last extraction cell contains coffee that has been largely extracted. The extract from the last cell is supplied to the last extraction cell but one as an extraction liquid; subsequently, the extract from that cell is again supplied to the next cell, until the first cell is reached.

When the last extraction cell has been exhaustively extracted, that is to say, that the liquid leaving the cell does not deviate appreciably from the liquid supplied, this cell is connected through to the secondary extraction. This can be effected at any desired moment during the extraction cycle but is preferably done halfway. A new cell is connected as a first extraction cell at the beginning of a cycle, which new cell contains fresh coffee. This means that, during a portion of the cycle, the extraction may comprise one cell more than the number of cells indicated.

In this connection the term cycle is defined as the period which begins with the connection of a cylinder or cell with fresh coffee and ends at the moment when the desired amount of extract has been drawn off and a new cylinder or cell with fresh coffee is connected.

The cell originally connected as the first secondary extraction cell is connected through and now functions as the second secondary extraction cell. The other cells are connected through in a similar manner. During this operation, the feed of the extraction liquid is displaced one cell. The secondary extraction cell that was originally the last is taken off-stream and emptied so that it may be re-filled with fresh coffee at a later stage.

The embodiment described above is not based on the use of a specific number of primary extraction cells; it is clear, however, that the use of any given number of cells is possible.

The process according to the present invention permits using different extractors from battery extractors. The only essential feature in this connection is that the liquid contents of the extraction unit connected through from the primary extraction to the secondary extraction is not used as a secondary extract, but is supplied to the primary extraction as an extraction fluid. Suitable types of extractors are well known to those skilled in the art.

The coffee used in the process according to the invention is the usual roasted and ground coffee. In connection with the tolerable pressure drop in the equipment, however, the coffee is less finely ground than is conventional for domestic use. As well known to those skilled in the art, a rather coarsely ground coffee is more conventional for the extraction of coffee on an industrial scale.

The present invention also relates to a coffee extract obtained using the process according to the invention. This coffee extract may be in the form of powder which can be mixed with water to form coffee, but it may alternatively have the form of a concentrated liquid, which liquid can be marketed, if desired in deep-frozen form. Such a concentrate can then be used with advantage for quickly providing coffee in large quantities.

BRIEF DESCRIPTION OF THE DRAWING

The invention will now be described with reference to the accompanying drawing, which shows a block diagram of one embodiment of the invention.

detailed description

The accompanying drawing illustrates an embodiment of the invention in which the concentration of the primary extract is effected by means of freeze concentration, and the concentration of the secondary extract is effected in a conventional manner, namely, by the evaporation of water.

In the Figure, the letters A–J designate nine extraction cells, with A being the primary extraction cell which contains the least extracted coffee, and from which the primary extract is drawn off. D is the fourth primary extraction cell. The illustrated example is based on a primary extraction carried out in four separate cells. As indicated before, it is within the scope of the present invention to use one to three cells, or, conversely, five or more cells. The secondary extraction is carried out in cells E–J.

The extraction is carried out in cycles. During one cycle, fresh primary extraction liquid is supplied to cell D through line 1. Through lines 20 connecting the cells with each other, the extract from cell D is supplied to cell C, etc. In the end, the primary extract is drawn off from cell A and supplied through line 2 to freeze concentration unit 3. Through line 4, substantially water is discharged from freeze concentration unit 3.

Separately from the primary extraction, the secondary extraction is carried out in cells E–J. Cell E contains the coffee that has been exhaustively subjected to primary extraction. The coffee present in cells F–J has already been partially extracted by secondary extraction. Through line 5, fresh secondary extraction liquid is supplied to cell J. Through conduits 21, connecting the cells together, extract is passed from cell J to H, and from H to G, etc. The secondary extract is drawn off from cell E and is supplied through line 6 to evaporator 7 in which secondary extract is concentrated through the evaporation of water. This can be effected, for example, by heating, possibly in combination with vacuum. Under these conditions, aroma components still present in the secondary extract are also removed. As these are the very components which have an adverse effect on the taste, such a process has a favourable effect on the quality of the coffee to be made from the extract. Water vapour and aroma components are discharged from evaporator 7 through line 8.

When the secondary extract has been concentrated, it is supplied through line 9 to mixer 10, where it is mixed with concentrated primary extract supplied through line 11 from unit 3 to form a mixture of concentrated primary extract and concentrated secondary extract. The mixture is supplied through line 12 to unit 13. In unit 13, the extract is converted into its final form, for example, into a deep-frozen extract, or into power by freeze drying.

In the course of the extraction, a fresh cell (A') not shown, containing fresh coffee, is connected to the battery, with which a new cycle begins. The cell A' may actually be cell J, emptied and repacked with fresh ground coffee, or a further cell of the battery A–J, which is placed into service as cell J is removed for emptying and repacking. In the figure, this is indicted by line 15, through which, as it were, fresh, ground coffee is supplied. When the coffee in cell D has been exhaustively extracted, cell D is connected through to the secondary extraction in the course of the cycle. (The terms "first" and "last" are used herein to the describe positions of cells in respective banks, with regard to the packing of ground coffee therein, and not with regard to the order of passage of extraction liquid therethrough, which, being countercurrent, is opposite, so that in each bank of extraction cells the first cell to receive coffee, is the last cell to receive the respective extraction liquid. By use of the term "connecting through" it is meant that a cell formerly connected in series in the primary extraction cell bank, is disconnected from the primary extraction cell bank as the last cell in the primary extraction cell bank and connected instead as the first cell in the secondary extraction cell bank.) Thus, whereas cell D was the initial cell in the primary cell bank to be contacted by fresh extraction liquid incoming through the line 1, upon being connected through, the cell D is no longer in the primary extraction cell bank, but instead occupies the role formerly occupied by the cell E, i.e., it becomes the terminal cell in the secondary extraction cell bank, i.e., the last one through which secondary extract flows and causes secondary extraction, until leaving the secondary extraction cell bank through the line 6. As part of this same switch-over of cell D from the primary to the secondary extraction cell bank, cell C becomes the primary extraction cell to which fresh extraction fluid is supplied, i.e., taking up the role formerly served by cell D. Cell D then becomes the first secondary extraction cell, while cells, the last secondary cell is taken off-stream and the coffee grounds present therein are thrown away. This is indicated by line 16.

When the last primary cell, i.e., cell D, in this example, has been connected through to the secondary extraction, according to the invention, the first amount of extract from the new secondary extraction cell, i.e., cell D, in this example, is not passed to evaporator 7 but this fluid, which in practice contains no, or substantially no, solids extracted in the secondary extraction, is passed through line 17 from cell D to cell C. When an amount of liquid corresponding to the liquid contents of the cell has been drawn off from cell D, the tap, where line 17 branches from line 6, is switched off and the secondary extract thereafter withdrawn from cell D through line 6 is supplied to evaporator 7.

The invention is illustrated in and by the following example, which is given by way of illustration only and should not be construed to limit the invention in any way.

EXAMPLE

Using apparatus as shown in the figure, ground coffee was extracted in a diffusion battery. Using four primary extraction cylinders and five cylinders for the secondary extraction, each with an amount of coffee of about 250 kg, and using an average cycle period of 45 min, coffee extract was prepared continuously.

In the primary extraction, the ground coffee 1 was extracted using water having a temperature of about 90° C. and a draw-off factor of about 4. The feed of extraction liquid (water) was 1620 kg per cycle, the first 430 kg of which came from the first secondary extraction cylinder. The solids contents of the primary extract was 6.25%, and the extraction efficiency was about 25%.

The secondary extraction was carried out using water of 172° C. and a draw-off factor of 3. The efficiency in the secondary extraction was 20% while the solids contents in the secondary extract was 6.7%.

It is noted that a back-pressure valve was included in the draw-off conduits of both extraction units to prevent the extracts from starting to boil, which is undesirable in connection with de-gassing and the like.

The primary extract was supplied to a freeze concentration unit comprising a crystallizer and a washing column. With a feed of 1333 kg/h, an amount of concentrate of 208 kg/h was obtained, with a dry content of about 40%. The secondary extract was concentrated by evaporation, which produced a quantity of 168 kg/h with a dry content of about 40%.

The concentrated extracts thus obtained were mixed, so that an extract stream of 376 kg/h was obtained with a dry content of about 40% by weight. The extract thus obtained was freeze dried, which produced about 150 kg/h of instant coffee powder.

A panel of coffee quality experts rated the product thus obtained as of very good quality and considerably superior to the conventional commercial products. Analytically, too, the product was shown to contain a considerably larger amount of aroma components than the other products referred to.

We claim:

1. A process for preparing an extract from ground, roasted coffee beans, comprising:

(a) providing a primary extraction cell bank having an inlet for extraction liquid and an outlet for primary extract, said primary extraction cell bank including at least one extraction cell, each extraction cell of said primary extraction cell bank being effectively connected between said inlet and said outlet so that extraction liquid introduced to said primary extraction cell bank will course through each extraction cell of said primary extraction cell bank before leaving said primary extraction cell bank as a primary extract through said outlet thereof;

(b) providing a secondary extraction cell bank having an inlet for extraction liquid and an outlet for secondary extract, said secondary extraction cell bank including at least one extraction cell, each extraction cell of said secondary extraction cell bank being effectively connected between said inlet of said secondary extraction cell bank and said outlet of said secondary extraction cell bank so that extraction liquid introduced to said secondary extraction cell bank will course through each extraction cell of said secondary extraction cell bank before leaving said secondary extraction cell bank as a secondary extract through said outlet thereof;

(c) charging each extraction cell in said primary extraction cell bank with ground, roasted coffee beans;

(d) providing each extraction cell in said secondary extraction cell bank with a charge of ground, roasted coffee beans which have already been subjected to primary extraction in said primary extraction cell bank;

(e) conducting a primary extraction of said ground, roasted coffee beans charged in said primary extraction cell bank, including introducing a stream of primary extraction liquid, devoid of said secondary extract, into said primary extraction cell bank through said inlet thereof and withdrawing a stream of primary extract from said primary extraction cell bank through said outlet thereof, said primary extraction being carried out at a temperature which is maximally equal to the boiling point of water at atmospheric pressure and in the absence of said secondary extract, in order to progressively remove from the ground, roasted coffee beans in said primary extraction cell bank only such components as are directly soluble in water;

(f) conducting a secondary extraction of said ground, roasted coffee beans provided as a charge in said secondary extraction cell bank, including introducing a stream of secondary extraction liquid into said secondary extraction cell bank through said inlet thereof and withdrawing a stream of secondary extract from said secondary extraction cell bank through said outlet thereof, said secondary extraction being carried out at a temperature which is above that used in conducting said primary extraction and such that a portion of solids in said ground, roasted coffee beans that was insoluble under conditions prevailing during said primary extraction, is hydrolysed to form soluble components which are extracted in said secondary extraction;

(g) periodically removing from said primary extraction cell bank an extraction cell effectively closest to said inlet of said primary extraction cell bank upon achievement of substantially complete exhaustion of the charge of ground, roasted coffee beans therein insofar as extractability of coffee solubles therefrom by said primary extraction is concerned, and adding this cell, still containing its charge of primary extracted ground, roasted coffee beans and its filling of extraction liquid, to said secondary extraction cell bank so as to be effectively closest to said outlet of said secondary extraction cell bank;

(h) correspondingly periodically removing from said secondary extraction cell bank an extraction cell effectively closest to said inlet of said secondary extraction cell bank, emptying this cell of its charge of secondary extracted ground, roasted coffee beans, adding this cell to said primary extraction cell bank as an extraction cell effectively closest to said outlet of said primary extraction cell bank, and conducting step (c) in regard to this cell;

(i) each time step (g) of conducted, withdrawing approximately so much of said filling of extraction liquid from the cell which has just been removed from the primary extraction cell bank and added to the secondary extraction cell bank as will drain therefrom, including at least 75 percent of said filling of extraction liquid contained in this cell when this cell was removed from the primary extraction cell bank but substantially no secondary extraction liquid introduced into this cell as a result of initiation of step (f) in regard thereto after this cell has been added to the secondary extraction cell bank, and adding the extraction liquid thereby withdrawn from this cell, to said stream of primary extraction liquid being introduced to said primary extraction cell bank in step (e), thereafter reverting to conducting steps (e) and (f), respectively, in regard to the primary extraction cell bank and secondary extraction cell bank;

(j) concentrating said primary extract obtained from said primary extraction cell bank through said outlet thereof, to provide a concentrated primary extract;

(k) concentrating said secondary extract obtained from said secondary extraction cell bank through said outlet thereof, minus said extract or liquid withdrawn from each respective said cell in step (i), and thereby removing both water vapor and at least some undesirable aroma constituents from said secondary extract, to provide a concentrated secondary extract; and (l) mixing said concentrated primary extract and said concentrated secondary extract to provide a concentrated coffee extract product.

2. The process of claim 1, wherein:
the ratio of water to ground, roasted coffee beans in said primary extraction cell bank while conducting step (e) is in the range of from about 3 to about 20.

3. The process of claim 1, wherein:
while conducting step (j), substantially all of the aroma constituents present in the primary extract are maintained in or recovered and returned to said concentrated primary extract.

4. The process of claim 3, wherein:
step (j) is conducted by performing freeze concentration on said primary extract.

5. The process of claim 3, wherein:
step (j) is conducted by performing reverse osmosis on said primary extract.

6. The process of claim 3, wherein:
step (j) is conducted by stripping aroma components of the primary extract using steam, collecting the stripped aroma components, concentrating the stripped primary extract by evaporation of water, and returning the stripped aroma components to the resulting concentrate.

7. The process of claim 1, further including:
(m) deep freezing said concentrated coffee extract product.

8. The process of claim 1, further comprising:
(m) processing said concentrated coffee extract product to form a powder by withdrawal of moisture thereof.

9. The process of claim 8, wherein:
step (m) is conducted by spray drying said concentrated coffee extract product.

10. The process of claim 8, wherein:
step (m) is conducted by freeze drying said concentrated coffee product.

11. The process of claim 1, wherein:
while step (e) is being conducted, said primary extraction cell bank includes at least two of said extraction cells, connected in series.

12. The process of claim 1, wherein:
while conducting step (f) is being conducted, said secondary extraction cell bank includes at least two of said extraction cells, conducted in series.

13. The process of claim 1, wherein:
while step (e) is being conducted, said primary extraction cell bank includes at least two of said extraction cells, connected in series; and
while conducting step (f) is being conducted, said secondary extraction cell bank includes at least two of said extraction cells, conducted in series.

14. The process of claim 1, wherein:
the primary extraction of step (e) is carried out at a temperature in the range of from 80° C. to 100° C.

15. The process of claim 1, wherein:
the secondary extraction of step (f) is carried out at a temperature in the range of from 120° C. to 165° C.

16. The process of claim 1, wherein:
the primary extraction of step (e) is carried out at a temperature in the range of from 80° C. to 100° C.; and
the secondary extraction of step (f) is carried out at a temperature in the range of from 120° C. to 165° C.

17. The process of claim 1, wherein:
the ratio of water to ground, roasted coffee beans in said primary extraction cell bank while conducting step (e) is in the range of from about 3 to about 20;
while conducting step (j), substantially all of the aroma constituents present in the primary extract are maintained in or recovered and returned to said concentrated primary extract;
step (j) is conducted by performing freeze concentration on said primary extract;
while step (e) is being conducted, said primary extraction cell bank includes at least two of said extraction cells, connected in series;
while conducting step(f) is being conducted, said secondary extraction cell bank includes at least two of said extraction cells, conducted in series;
the primary extraction of step (e) is carried out at a temperature in the range of from 80° C. to 100° C.;
the secondary extraction of step (f) is carried out at a temperature in the range of from 120° C. to 165° C.; and
said method further comprising:
(m) processing said concentrated coffee extract product to form a powder by withdrawal of moisture thereof, step (m) being conducted by freeze drying said concentrated coffee product.

* * * * *